(12) United States Patent
Klamra

(10) Patent No.: US 11,544,314 B2
(45) Date of Patent: Jan. 3, 2023

(54) PROVIDING MEDIA BASED ON IMAGE ANALYSIS

(71) Applicant: Spotify AB, Stockholm (SE)

(72) Inventor: Mikael Simon David Klamra, Stockholm (SE)

(73) Assignee: Spotify AB, Stockholm (SE)

( * ) Notice: Subject to any disclaimer, the term of this patent is extended or adjusted under 35 U.S.C. 154(b) by 207 days.

(21) Appl. No.: 16/786,774

(22) Filed: Feb. 10, 2020

(65) Prior Publication Data
US 2020/0409984 A1 Dec. 31, 2020

(30) Foreign Application Priority Data
Jun. 27, 2019 (SE) .................................... 1950799-5

(51) Int. Cl.
*G06F 16/435* (2019.01)
*H04L 67/306* (2022.01)
*G06F 16/2457* (2019.01)
*G06V 40/16* (2022.01)
(Continued)

(52) U.S. Cl.
CPC ...... *G06F 16/435* (2019.01); *G06F 16/24575* (2019.01); *G06F 16/24578* (2019.01); *G06V 40/174* (2022.01); *H04L 67/306* (2013.01); *H04L 67/535* (2022.05); *H04L 65/60* (2013.01)

(58) Field of Classification Search
CPC ............. G06F 16/435; G06F 16/24575; G06F 16/24578; G06K 9/00302; G06K 9/00624
See application file for complete search history.

(56) References Cited

U.S. PATENT DOCUMENTS

| 9,153,239 | B1 | 10/2015 | Postelnicu et al. |
| 9,684,715 | B1 | 6/2017 | Ross et al. |
| 2007/0038671 | A1 | 2/2007 | Holm et al. |

(Continued)

FOREIGN PATENT DOCUMENTS

| CN | 109471954 A | 3/2019 |
| WO | WO 2007004139 A2 | 1/2007 |

(Continued)

OTHER PUBLICATIONS

Spotify AB, Office Action Statement, SE 1950799-5, dated Dec. 16, 2019, 11 pgs.
(Continued)

*Primary Examiner* — Jay A Morrison
(74) *Attorney, Agent, or Firm* — Morgan, Lewis & Bockius LLP

(57) ABSTRACT

The present disclosure relates to a method of providing media to a user based on analysis of an image. The method comprises analysing the image to obtain image information about what is depicted therein. The method also comprises, based on said obtained image information, selecting a first plurality of media items comprising audio, from a media database, said media items of the first plurality being associated with that which is depicted in the image according to the image information. The method also comprises filtering the first plurality of media items based on metadata associated with the user to obtain a plurality of seed media items. The method also comprises providing at least one media item from the media database to the user based on the obtained seed media items.

20 Claims, 2 Drawing Sheets

(51) Int. Cl.
*H04L 67/50* (2022.01)
*H04L 65/60* (2022.01)

(56) References Cited

U.S. PATENT DOCUMENTS

| | | | |
|---|---|---|---|
| 2009/0061974 A1* | 3/2009 | Lutnick | A63F 13/422 |
| | | | 463/13 |
| 2010/0325135 A1 | 12/2010 | Chen et al. | |
| 2013/0226850 A1* | 8/2013 | Hannuksela | G10L 25/48 |
| | | | 706/14 |
| 2013/0325135 A1 | 12/2013 | Crabtree, Jr. et al. | |
| 2014/0114772 A1 | 4/2014 | Mok et al. | |
| 2016/0147752 A1* | 5/2016 | Manning | G06F 16/4387 |
| | | | 715/738 |
| 2016/0353278 A1* | 12/2016 | Paschel | H04L 63/08 |
| 2017/0097992 A1 | 4/2017 | Vouin et al. | |
| 2018/0189390 A1 | 7/2018 | Cremer et al. | |
| 2018/0219814 A1* | 8/2018 | Maarek | H04L 51/08 |
| 2020/0311116 A1* | 10/2020 | Anvaripour | G06F 16/24578 |

FOREIGN PATENT DOCUMENTS

| | | |
|---|---|---|
| WO | WO 2007057850 A2 | 5/2007 |
| WO | WO 2009001202 A1 | 12/2008 |

OTHER PUBLICATIONS

Heo et al., "Cover song identification with metric learning using Distance as a feature".

* cited by examiner

PROVIDING MEDIA BASED ON IMAGE ANALYSIS

RELATED APPLICATIONS

The present disclosure claims priority to Swedish patent application 1950799-5, filed Jun. 27, 2019, which is hereby incorporated by reference in its entirety.

TECHNICAL FIELD

The present disclosure relates to a method and system for providing media to a user.

BACKGROUND

A service provider for providing media to a user may suggest media items based on user history, e.g. based on what genre of songs, videos or other types of media items provided by the service provider the user usually listens to. The service provider may also suggest media items for an activity, e.g. running or meditation, based on metadata of the media items. For instance if the media items are included in a playlist for running.

SUMMARY

It is an objective of the present invention to provide media to a user based on both image analysis and historic user data.

According to an aspect of the present invention, there is provided a method of providing media to a user based on analysis of an image. The method is performed at a server system that includes one or more processors and memory storing instructions for execution by the one or more processors and memory. The method comprises analysing the image to obtain image information about what is depicted therein. The method also comprises, based on said obtained image information, selecting a first plurality of media items comprising audio, from a media database, said media items of the first plurality being associated with what is depicted in the image according to the image information. The method also comprises filtering the first plurality of media items based on metadata associated with the user to obtain a plurality of seed media items. The method also comprises providing at least one media item from the media database to the user based on the obtained seed media items.

According to another aspect of the present invention, there is provided a server system comprising one or more processors, and memory (e.g., data storage) storing instructions executable by said one or more process, whereby said server system is operative to perform an embodiment of the method of the present disclosure.

According to another aspect of the present invention, there is provided a computer program product (e.g., a non-transitory computer readable storage medium) comprising computer-executable components (e.g., instructions) for causing a server system to perform an embodiment of the method of the present disclosure when the computer-executable components are run on one or more processed comprised in the server system.

By means of image analysis, media items comprising audio, which correspond to contents of an image (e.g. an image taken or otherwise indicated by the user), or rather to what is depicted in the image, are obtained. However, said obtained media items may not correspond well with a user's user history, e.g. what type/genre of media the user usually consumes. By also filtering the obtained media items based on metadata of the user, seed media item(s) are obtained which may then be used for obtaining and providing media items to the user which correspond well to both the image and to the user history.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
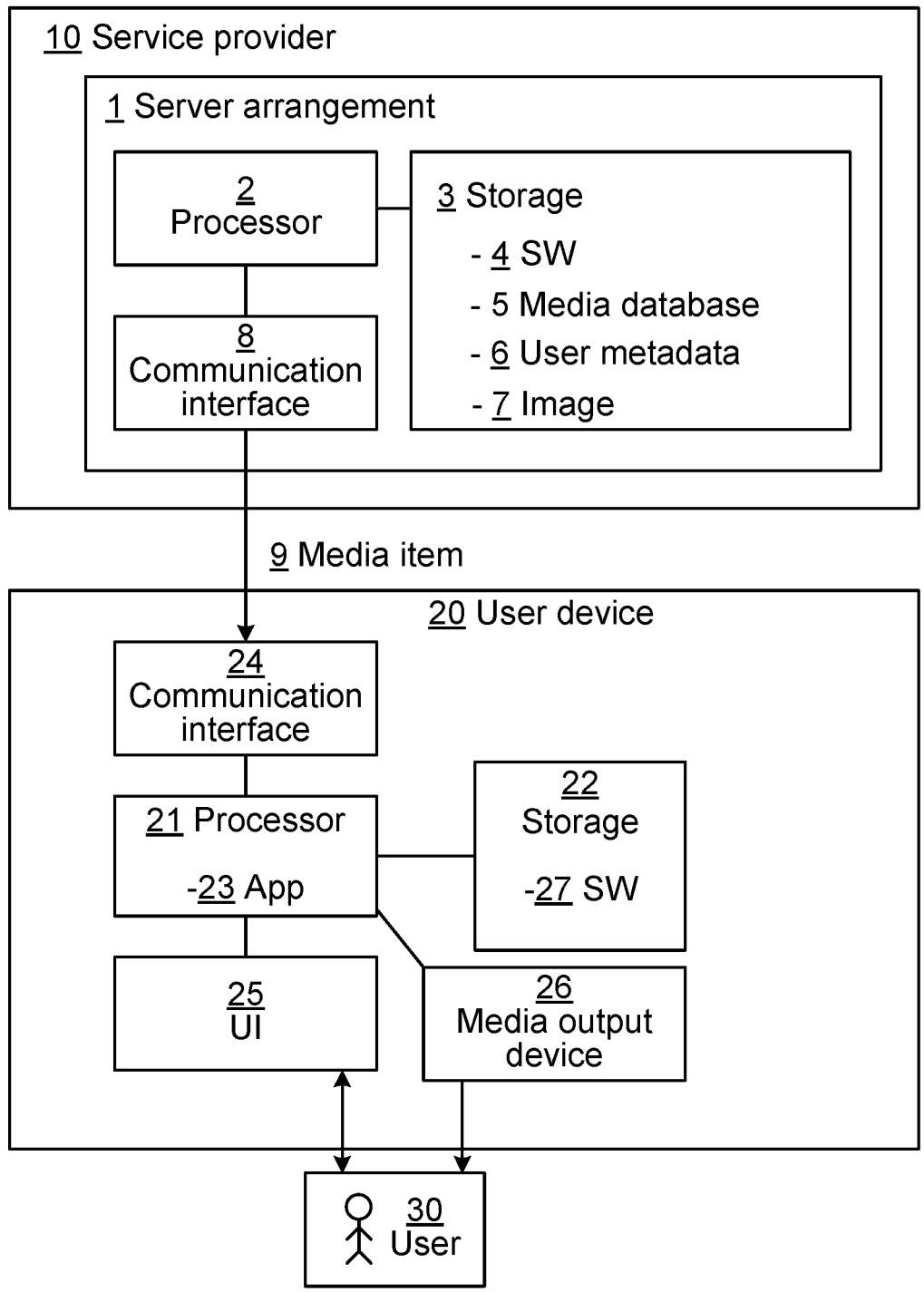
FIG. 1 is a schematic block diagram of a communication system comprising servers of a service provider and a user device of a user, in accordance with embodiments of the present invention.

FIG. 1 illustrates a communication system 100 comprising a service provider 10 and a user device 20 of a user 30. The service provider may e.g. be configured to provide a service (e.g. media streaming or download) to the user 30 having a user account with the service provider, e.g. via a service client 23, typically in the form of a software application, e.g., an app, installed in the user device 20.

The service provider 10 comprises a server arrangement 1 (e.g., a server system) of at least one data server. The server arrangement 1 comprises processing circuitry 2 (e.g., one or more processors, a central processing unit (CPU), etc.). The processing circuitry 2 may comprise one or a plurality of processing units in the form of microprocessor(s). However, other suitable devices with computing capabilities could be comprised in the processing circuitry 2, e.g. an application specific integrated circuit (ASIC), a field programmable gate array (FPGA) or a complex programmable logic device (CPLD). The processing circuitry 2 is configured to run one or several computer program(s) or software (SW) 4 stored in a data storage 3 of one or several storage unit(s) e.g. memory. The storage unit is regarded as a computer program product (e.g. a non-transitory computer-readable storage medium), comprising computer-executable components (e.g., instructions) of the SW 4 on a non-volatile computer readable means/media, as discussed herein and may e.g. be in the form of a Random Access Memory (RAM), a Flash memory or other solid state memory, or a hard disk, or be a combination thereof. The processing circuitry 2 may also be configured to store data in the storage 3, as needed.

In accordance with different embodiments of present invention, the data storage 3 may also comprise a media database 5, account information of a user account of the user 30 with the service provider 10 and/or at least one image which is analysed as discussed herein. The image may e.g. have been provided by the user 30, e.g. using a camera of the user device 20. In some embodiments, the image may have been derived from a video. The media database typically comprises a plurality of media items 9 which the server arrangement 1 is able to provide, e.g. send, stream or download, to the user device 20 via a communication interface 8 of the server arrangement 1. The account information 6 may e.g. comprise information about historic media consumption of the user, e.g. which media items 9 (e.g. that include audio) from the media database 5 which the user has previously played on the user device 20.

The user device 20 may be any device or user equipment (UE), mobile or stationary, enabled to communicate with the server arrangement 1 via a communication interface 24, for instance but not limited to e.g. mobile phone, smartphone, vehicles (e.g. a car), household appliances, media players, cameras, or any type of consumer electronic, for instance but not limited to television, radio, lighting arrangements, tablet computer, laptop, or personal computer (PC).

The user device 20 comprises processing circuitry 21 e.g. a central processing unit (CPU) or other set of one or more processors. The processing circuitry 21 may comprise one or a plurality of processing units in the form of microprocessor(s). However, other suitable devices with computing capabilities could be comprised in the processing circuitry 21, e.g. an application specific integrated circuit (ASIC), a field programmable gate array (FPGA) or a complex programmable logic device (CPLD). The processing circuitry 21 is configured to run one or several computer program(s) or software (SW) 27 stored in a data storage 22 of one or several storage unit(s) e.g. a memory. The storage unit is regarded as a computer program product, comprising computer-executable components of the SW 27 on a non-volatile computer readable means/media, as discussed herein and may e.g. be in the form of a Random Access Memory (RAM), a Flash memory or other solid state memory, or a hard disk, or be a combination thereof. The processing circuitry 21 may also be configured to store data in the storage 22, as needed.

The SW 27 of the data storage 22 may comprise application software for providing a software application, app, 23 when run on the processing circuitry 21 of the user device 20. The app 23 may act as a client to the service provider 10. The app 23 may e.g. configure the user device 20 to obtain media items 9 from the media database 5 of the server arrangement 1 via the respective communication interfaces 8 and 24 of the server arrangement 1 and the user device 20.

The user device 20 may also comprise a user interface (UI) 25 for interaction with the user 30. The UI 25 may e.g. comprise buttons, a display and/or a graphical UI (GUI), e.g. comprising a touchscreen, for output of information to the user and input from the user. The user may e.g. choose media items 9 from the media database 5 to play on the user device 20, e.g. using a media output device 26, typically comprising a speaker, of the user device. Each of the media items 9 comprises audio and may e.g. be in a music and/or video format.

Thus, the user 30 may have a user account with the service provider 10 for accessing media from the media database 5, e.g. listening to music or watching video. The account allows the user to obtain (e.g. stream or download) media items 9 from the media database 5 to the user device, e.g. by means of an app 23 running on the user device and acting as a client to the service provider, and to play the obtained media items on the user device, typically by means of the media output device 26.

Figure 2:
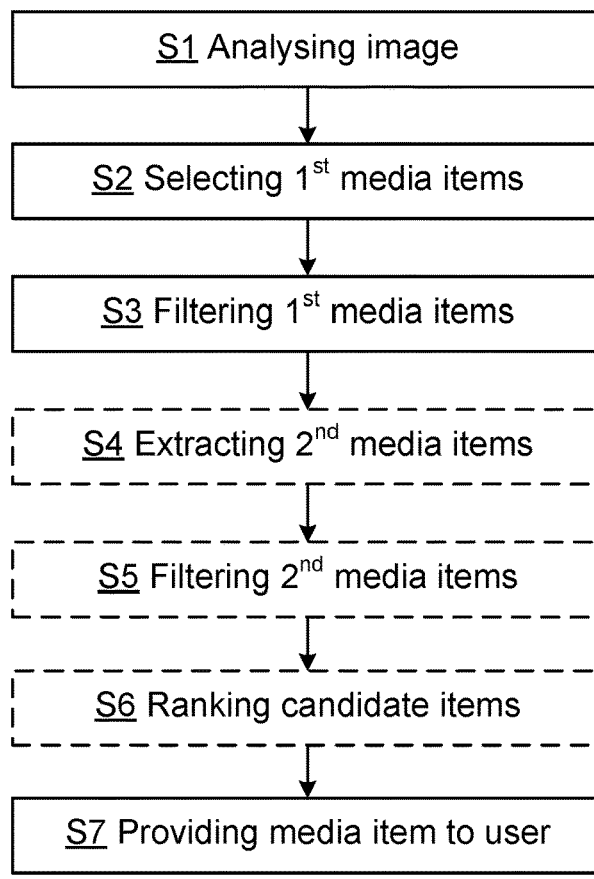
FIG. 2 is a schematic flow chart of embodiments of a method of the present invention.
Figure 3:
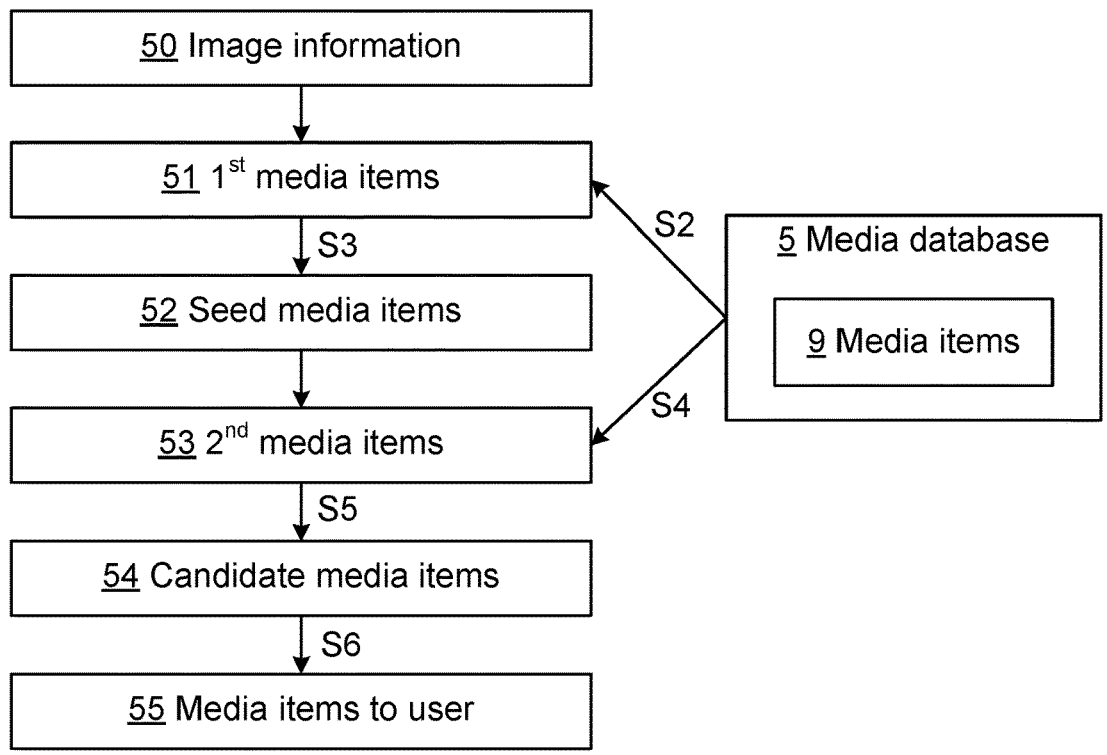
FIG. 3 is a schematic flow chart of embodiments of processing of media items, in accordance with the present invention.

FIGS. 2 and 3 illustrate different embodiments of a method of the present invention. In some embodiments, the methods describe with reference to FIGS. 2 and 3 are performed at a server system (e.g. server arrangement 1, FIG. 1). In some embodiments, the server system includes one or more processors and memory. The memory stores instructions for performing a set of operations comprising the methods described with reference to FIGS. 2 and 3. The method is for providing audio comprising media 9 to a user 30 (e.g., to a client device of the user) based on image analysis of an image 7. The image 7 may be taken (e.g. by a camera of the user device 20) or otherwise selected by the user and provided to the server arrangement 1, e.g. stored in the data storage 3 of the server arrangement 1.

The image 7 is analysed S1 to obtain image information 50 about what is depicted in the image (e.g. analyse content of the image). The information may e.g. include information about what is happening in the image and/or a mood of the image. The image analysis may e.g. comprise determining whether a person is depicted in the image, and in that case possibly whether there is a face expression of that person and what that face expression may be, and/or whether the person performs an activity such as running or relaxing/meditating. Otherwise, the image analysis may determine that the image is of a landscape and a mood of that landscape, e.g. weather or time of year.

For instance, an image analysis service such as Microsoft Computer Vision™ or Amazon Rekognition™ may be used, which e.g. returns any of the following feature items:

Labels (e.g. tree, running, New York).
Objects (e.g. bike, car, person etc.) present in the image.
Landmarks present in the image (e.g. the Eiffel Tower).
Brands present in the image (e.g. Spotify).
Celebrities present in the image.
Face expressions of an emotion of any person in the image (e.g. expressing joy, sorrow, anger etc.).
Text present in the image.

For instance, each feature item scored with a probability of 1 . . . 0 for whether the item is included in the image. Alternatively, machine learning may be used to determine what is happening in the image.

Based on the obtained information 50 about what is depicted in the image 7 (e.g. the content of the image), a first plurality of media items 51 from the media database 5 are selected S2. Said media items 51 include audio content. Said media items 51 of the first plurality are associated with that which is depicted in the image according to the image information 50. In some embodiments, the first plurality of media items are identified based on a determination, for each of respective media item of the first plurality of media items, that the audio content of the respective media items corresponds (e.g. is relevant to) the image information about the content of the image. For instance, the media items 51 of the first plurality of media items may be associated by being manually tagged or having other metadata which associates it with what is depicted in the image. As an example, labels (e.g. returned from an image analysis service) may be ranked based on respective scores thereof and the ranked labels may then be matched to metadata of media items. For instance, the most popular (e.g. most played by users of the media service) media items 9 among the matched media items may be chosen, e.g. resulting in a plurality of media items per label, ranked for popularity.

The first plurality of media items 51 may then be filtered S3 based on metadata 6 associated with the user 30, e.g. including manual input of the user via the UI 25 and/or account information of an account of the user at the service provider 10, to obtain a plurality of seed media items 52. The filtering may e.g. be binary filtering indicating whether each media item 9 of the first plurality of media items 51 corresponds well with the media items usually consumed by the user, e.g. whether the media items 51 are in the same genre as the media items usually consumed by the user. A machine learning algorithm may be used to determine whether each of the first plurality of media items 51 is suitable for the user based on the account information 6 comprising information about the historic media consumption of the user 30. Thus, media items 9 which correspond well with both the image 7 and the media consumption of the user 30 can be obtained. For instance, starting with the most relevant label, and if needed moving on to the less relevant label(s), the top (e.g. top 20) ranked media items are chosen as seed media items 52. These seed media items 52 may be provided S7 to the user, or other media items which have been selected based on said seed media items 52, e.g. as outlined below.

For each of the obtained seed media items 52, a second plurality of media items 53 may be extracted S4 from the media database 5, each of which media items 53 of the second plurality comprising audio and being similar to the seed media item. This may be done e.g. if there is a desire to provide S7 more media items than the seed media items 52 to the user. The second plurality of media items 53 may e.g. be regarded as similar (e.g., identified as similar) because of manual labelling or other metadata of each of the second plurality of media items in relation with or because (e.g. based on a determination that) each of the media items 53 of the second plurality appears in a same playlist as the seed media item 52 (e.g. according to account information 6 of the user 30 or other users of the service of the service provider 10) or is more often than random played close in time to the seed media item 52 from the media database 5 and/or in accordance with account information 6 of the user 30 or other users of the service of the service provider 10 and/or in accordance with collaborative filtering. Again, machine learning algorithms may be used to determine that a media item 53 of the second plurality is similar to its seed media item 52.

Optionally, e.g. if the number of media items 53 of the second plurality is regarded as too large, the second plurality of media items 53 may again be filtered S5, e.g. binary filtering, based on the metadata 6 associated with the user 30. In some embodiments, the filtering of the second plurality of media items results in a plurality of candidate media items. In some embodiments, the candidate media items are a subset, less than all, of the second plurality of media items. Thus, it is again made sure that the media items proceeded with correlate well with the metadata 6 of the user which may be regarded as a proxy for a media taste of the user. By the filtering, candidate media item(s) 54 (e.g., a plurality of candidate media items) are obtained which are similar to one or more of the seed media items 52.

Optionally, especially if the number of candidate media items 54 is too large in spite of the filtering S5, the obtained candidate media items 54 may be ranked S6 based on the obtained image information 50 from most relevant (e.g. highest ranked) to least relevant. A predetermined number (e.g. 5, 10, 20, 100) of the highest ranked media items may be selected to be provided to the For instant, the ranking S6 of the candidate media items 54 may be based on any of:

Popularity of the candidate media items, e.g. as defined by being most played by the users 30 of the service of the service provider 10.

Manual tagging of the candidate media items. Each candidate media item may be tagged in the media database 5 with labels, objects, landmarks, brands etc. that match the candidate media item. Then, the ranking S6 of the candidate media items may be based on how well their labels, objects, landmarks, brands etc. match the labels, objects, landmarks, brands etc. of the image 7.

Mood of each of the candidate media items in relation to a mood of the image 7 determined from the obtained image information 50. Each of the candidate media items 54 may e.g. be provided with metadata indicating said mode thereof, e.g. including an indication about how happy or sad the media item is. For instance, when the analysing S1 of the image 7 indicates that a facial expression is depicted in the image, the ranking S6 of the candidate media items 54 may be based on the mood of each of the candidate media items in relation to a mood of the facial expression determined from the obtained image information 50, e.g. as determined by an image analysis service.

Additionally or alternatively, the selecting S2 of the first plurality of media items 51 is based on a first part of the obtained image information 50, e.g. labels, and the ranking S6 of the candidate media items 54 is based on a second, different, part of the obtained image information, e.g. face expressions, wherein both parts may be obtained from an image analysis service.

Thus, a plurality of media items 55, e.g. the top hundred ranked S6 media items, e.g. songs, may be provided S7 to the user 30, which media items 55 are selected based both on the image 7 and on the metadata associated with the user. In some embodiments, at least one media item obtained from the seed media item and provided to the user was not identified as being associated with the image based on the image information.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure, e.g. including processing circuitries 2 and/or 21 as discussed herein. Appropriate software coding can readily be prepared by skilled programmers based on the teachings of the present disclosure, as will be apparent to those skilled in the software art.

In some embodiments, the present invention includes a computer program product 3 which is a non-transitory storage medium or computer readable medium (media)

having instructions stored thereon/in, in the form of computer-executable components or software (SW) 4, which can be used to program a computer to perform any of the methods/processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of providing media that includes audio to a user based on analysis of an image, the method comprising:
performing a set of operations at a server system with one or more processors and memory storing instructions for the one or more processors, the set of operations including:
analysing the content of the image to obtain image information about content of the image;
based on the analysis of the content of the image, selecting a first plurality of media items comprising audio, from a media database, the audio of said media items of the first plurality of media items being associated with the content of the image according to the image information obtained from analysing the content of the image;
after selecting the first plurality of media items associated with the content of the image, filtering the first plurality of media items based on metadata stored in a user history associated with the user to obtain a plurality of seed media items from the first plurality of media items; and
providing, to a client device associated with the user, at least one media item from the media database to the user based on a similarity between the at least one media item and a seed media item of the plurality of seed media items, wherein the at least one media item includes audio.

2. The method of claim 1, wherein the method further comprises, for the seed media item:
extracting a second plurality of media items from the media database which are similar to the seed media item; and
filtering the second plurality of media items based on the metadata of the user to obtain a plurality of candidate media items;
wherein the providing of the at least one media item to the user comprises providing the at least one media item based on the plurality of candidate media items.

3. The method of claim 2, wherein the second plurality of media items are identified as similar based on a determination that each of the second plurality of media items appears in a same playlist as the seed media item or is more often than random played close in time to the seed media item.

4. The method of claim 2, wherein the method further comprises:
ranking the plurality of candidate media items based on the obtained image information from most relevant to least relevant;
wherein the providing of the at least one media item to the user comprises providing a predetermined number of the highest ranked media items to the user.

5. The method of claim 4, wherein the ranking of the plurality of candidate media items is based on a mood of each of the candidate media items in relation to a mood of the image determined from the obtained image information.

6. The method of claim 5, wherein, when the analysing of the image indicates that a facial expression is depicted in the image, the ranking of the candidate media items is based on the mood of each of the candidate media items in relation to a mood of the facial expression determined from the obtained image information.

7. The method of claim 4, wherein the selecting of the first plurality of media items is based on a first part of the obtained image information and the ranking of the candidate media items is based on a second, different, part of the obtained image information.

8. A non-transitory computer-readable storage medium storing instructions that, when executed by a server system that includes one or more processors, cause the one or more processors to perform a set of operations comprising:
analysing the content of an image to obtain image information about content of the image;
based on the analysis of the content of the image, selecting a first plurality of media items comprising audio, from a media database, the audio of said media items of the first plurality of media items being associated with the content of the image according to the image information obtained from analysing the content of the image;
after selecting the first plurality of media items associated with the content of the image, filtering the first plurality of media items based on metadata stored in a user history associated with a user to obtain a plurality of seed media items from the first plurality of media items; and
providing, to a client device associated with the user, at least one media item from the media database to the user based on a similarity between the at least one media item and a seed media item of the plurality of seed media items, wherein the at least one media item includes audio.

9. A server system comprising:
one or more processors;
memory storing instructions that, when executed by the one or more processors, cause the server system to perform a set of operations comprising:
analysing the content of an image to obtain image information about content of the image;
based on the analysis of the content of the image, selecting a first plurality of media items comprising audio, from a media database, the audio of said media items of the first plurality of media items being associated with the content of the image according to the image information obtained from analysing the content of the image;
after selecting the first plurality of media items associated with the content of the image, filtering the first plurality of media items based on metadata stored in a user history associated with a user to obtain a plurality of seed media items from the first plurality of media items; and
providing, to a client device associated with the user, at least one media item from the media database to the user based on a similarity between the at least one media item and a seed media item of the plurality of seed media items, wherein the at least one media item includes audio.

10. The server system of claim 9, wherein the set of operations further comprises, for the seed media item:
   extracting a second plurality of media items from the media database which are similar to the seed media item; and
   filtering the second plurality of media items based on the metadata of the user to obtain a plurality of candidate media items;
   wherein the providing of the at least one media item to the user comprises providing the at least one media item based on the plurality of candidate media items.

11. The server system of claim 10, wherein the second plurality of media items are identified as similar based on a determination that each of the second plurality of media items appears in a same playlist as the seed media item or is more often than random played close in time to the seed media item.

12. The server system of claim 10, wherein the set of operations further comprises:
   ranking the plurality of candidate media items based on the obtained image information from most relevant to least relevant;
   wherein the providing of the at least one media item to the user comprises providing a predetermined number of the highest ranked media items to the user.

13. The server system of claim 12, wherein the ranking of the plurality of candidate media items is based on a mood of each of the candidate media items in relation to a mood of the image determined from the obtained image information.

14. The server system of claim 13, wherein, when the analysing of the image indicates that a facial expression is depicted in the image, the ranking of the candidate media items is based on the mood of each of the candidate media items in relation to a mood of the facial expression determined from the obtained image information.

15. The server system of claim 12, wherein the selecting of the first plurality of media items is based on a first part of the obtained image information and the ranking of the candidate media items is based on a second, different, part of the obtained image information.

16. The non-transitory computer-readable storage medium of claim 8, wherein the set of operations further comprises, for the seed media item:
   extracting a second plurality of media items from the media database which are similar to the seed media item; and
   filtering the second plurality of media items based on the metadata of the user to obtain a plurality of candidate media items;
   wherein the providing of the at least one media item to the user comprises providing the at least one media item based on the plurality of candidate media items.

17. The non-transitory computer-readable storage medium of claim 16, wherein the second plurality of media items are identified as similar based on a determination that each of the second plurality of media items appears in a same playlist as the seed media item or is more often than random played close in time to the seed media item.

18. The non-transitory computer-readable storage medium of claim 16, wherein the set of operations further comprises:
   ranking the plurality of candidate media items based on the obtained image information from most relevant to least relevant;
   wherein the providing of the at least one media item to the user comprises providing a predetermined number of the highest ranked media items to the user.

19. The non-transitory computer-readable storage medium of claim 18, wherein the ranking of the plurality of candidate media items is based on a mood of each of the candidate media items in relation to a mood of the image determined from the obtained image information.

20. The non-transitory computer-readable storage medium of claim 19, wherein, when the analysing of the image indicates that a facial expression is depicted in the image, the ranking of the candidate media items is based on the mood of each of the candidate media items in relation to a mood of the facial expression determined from the obtained image information.

* * * * *